United States Patent [19]

Tremblay

[11] Patent Number: 5,054,018

[45] Date of Patent: Oct. 1, 1991

[54] SPATIAL OPTIC MULTIPLEXER/DIPLEXER

[75] Inventor: Paul L. Tremblay, Idaho Falls, Id.

[73] Assignee: The United States of America as represented by the United States Department of Energy, Washington, D.C.

[21] Appl. No.: 542,215

[22] Filed: Jun. 22, 1990

[51] Int. Cl.⁵ .......................... H04J 1/00; G02F 1/00; G02B 6/32

[52] U.S. Cl. .................................... 359/114; 359/127; 385/33; 385/44

[58] Field of Search .................... 370/1, 3; 350/96.18, 350/96.15; 455/606, 607, 612

[56] References Cited

U.S. PATENT DOCUMENTS 4,834,485 5/1989 Lee ................................. 350/96.18

FOREIGN PATENT DOCUMENTS 0060605 4/1985 Japan ..................................... 370/1

Primary Examiner—Joseph A. Orisino
Assistant Examiner—Franklin V. Nguyen
Attorney, Agent, or Firm—Mark P. Dvorscak; Robert J. Fisher; William R. Moser

[57] ABSTRACT

An apparatus for simultaneous transmission of optic signals having different wavelengths over a single optic fiber. Multiple light signals are transmitted through optic fibers that are formed into a circumference surrounding a central core fiber. The multiple light signals are directed by a lens into a single receiving fiber where the light combines and is then focused into the central core fiber which transmits the light to a wavelength discriminating receiver assembly.

10 Claims, 3 Drawing Sheets

SPATIAL OPTIC MULTIPLEXER/DIPLEXER

The United States Government has rights in this invention pursuant to Contract No. DE-AC07-76ID01570 between the U.S. Department of Energy and EG&G Idaho, Inc.

BACKGROUND OF THE INVENTION

The present invention relates generally to secure fiber optic communications and more particularly to an apparatus which effects the efficient coupling of light from multiple optic fibers into a single optic fiber.

Optical fibers are essentially hollow tubes made of transparent dielectric materials. An annular cladding, or jacket, surrounds a central region, referred to as the core. In step-index fibers, the core and the jacket have fixed refractive indexes: the index of the cladding is less than that of the core. Light rays projected into the fiber are guided along it because of repeated total internal reflections at the cylindrical boundary between the core and the cladding materials. Optical fibers developed within the last five years have removed several impediments to reliable long distance high data rate transmission using devices gated in the time domain. These impediments were chiefly factors causing high attenuation, or light loss (large db/km) afforded to wavelengths available from devices capable of being modulated at the data rates desired (Gigabit/sec rates). However, despite the removal of these impediments, fibers are easily tapped and are seriously underutilized with respect to the available bandwidth.

Fundamental physical problems also suffered by fibers include dispersion, coupling losses, and reflection and refraction. Dispersion is the distortion of pulse shape with distance observed in fiber optics. It is caused by finite differences in the total path traveled both geometrically (intermodal) and through the variations in refractive index with wavelength characteristics of fiber materials (intramodal). Intermodal dispersion may be minimized by control of optical power launch conditions, reflections at interfaces, and large fiber bend radii. Intramodal dispersion may be minimized through use of narrow bandwidth sources, slower data rates, and/or de-skewing electronics at the link ends.

Inefficiencies in power transfer (coupling losses) engendered in having energy sources and sinks of differing impedance characteristics are well known in electronics. This phenomena asserts itself in optics as well. The chief contributors to coupling losses are area and numerical aperture mismatches of source and sink. Area losses may be minimized by accurate alignment of source to sink and by ensuring that the area illuminated by the source is small with respect to the sink angle of acceptance Numerical aperture losses may be minimized by ensuring that the source angle of emission is narrower than the angle of acceptance of the receiver.

Reflection and refraction are simultaneously the guiding principles and nemeses of fiber optic designs. The key element is the difference in characteristic impedance between media of propagation. The impedance of free space ($Z_s$) is approximately 377 ohms. The characteristic impedance of an isotropic dielectric medium ($Z_m$) is given by the following equation:

$$Z_m = \frac{Z_s}{n}$$

where n is the index of refraction of the medium. Reflections where detrimental may be controlled by use of impedance transforming sections (anti-reflection coatings) between media. Refractions where detrimental may be minimized by careful attention to the geometries of the desired radiation paths.

Current commercial fiber-optic communications utilize light emitting diodes (LEDs) which are broadband (40-60 nanometers(nm)) optical sources gated in the time domain to effect transmission of information. Techniques have been developed to split these bands through filtering or diffraction to allow use of the frequency domain as well. The use of the frequency domain within optical fibers has proven impractical for commercial purposes due to the severe attenuation of optical power by state of the art frequency and fiber coupling mechanisms. For example, in U.S. Pat. No. 3,953,727, a system for transmitting independent communication channels through a light-wave medium, high attenuation of the signal strengths results through multiple filtrations, reflections, and coupling inefficiencies of the fiber. Short of incorporating the wavelength selective dielectric films onto the structure of the LED, little gain has thus far been achieved in the use of discrete filter assemblies as discussed in that patent.

The geometries of the multiplexing sections, however, offer many possibilities for improvement. Multichannel and byte-wide data transfer without complicated serialization and de-serialization would provide immediate benefits. Combinations of this frequency division multiplexing and time division multiplexing could expand the present limitations on data security. Multi-channelled and full duplex communications over a single fiber may be possible.

Accordingly, an object of this invention is to transfer byte-wide data streams through a single optic fiber.

A further object of the invention is to minimize coupling inefficiencies between LEDs and fibers.

Another object of the invention is to minimize coupling inefficiencies between LEDs and fibers and the simplification and reduction of the components used to achieved this end.

Yet another object of the invention is the enhancement of data security, regardless of whether the transfer of byte-wide data is in parallel data or independent serial data streams, since tapping of multi-wavelength fibers is easily detected by monitoring of the variation of boundary wavelength signal levels at the detector.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the secure spatial optic multiplexer of this invention comprises multiple light sources each having a different wavelength transmitted through optic fibers. These fibers are formed into a close-packed bundle and surround a central core optic fiber. A small lens disposed proximally to the bundle directs the light into the central fiber so that the light emerging from the lens converges in the central fiber and transmits the different wavelengths simultaneously.

BRIEF DESCRIPTION OF THE DRAWINGS

The above-mentioned and other features of the invention will become more apparent and best understood, together with the description, by reference to the accompanying drawings, in which.

DETAILED DESCRIPTION OF THE INVENTION

Figure 1:
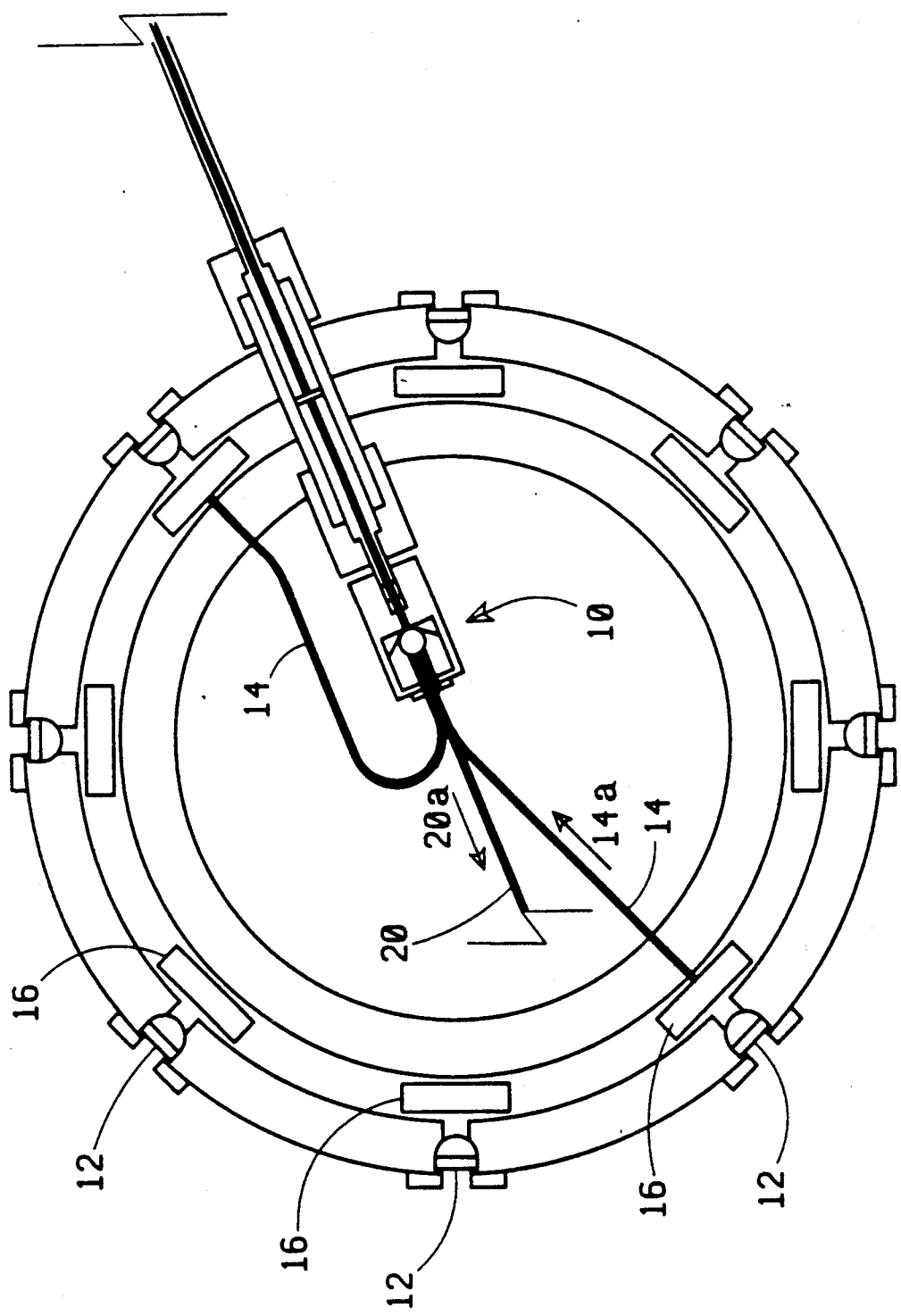
FIG. 1 shows multiple light sources transmitted to a spatial optic multiplexer.

Referring to FIG. 1, a spatial optic multiplexer 10 in accordance with the invention is depicted. A plurality of light emitting diodes (LEDs) 12 emit light of differing wavelengths through optical fibers 14. For purposes of illustration, only two fibers 14 are depicted in FIG. 1. It is understood that a fiber 14 is provided for the light emitted by each LED 12. The light emitted by each LED 12 is transmitted through the fibers 14 in the direction shown by arrow 14a toward the optic multiplexer 10. The LEDs are preferably edge-emitting InGaAsP LEDs having a continuous spectrum, the spectral distribution of which is approximately Gaussian. A filter 16 is placed between each LED 12 and optical fiber 14 and provides that the light transmitted through each fiber 14 is of a separate, non-overlapping wavelength within the allowable range of the fiber material. The filter 16 is preferably a multilayer dielectric film cut to isolate a single band of light of approximately ten (10) nanometers. The plurality of light emitted by the LEDs is coupled by the multiplexer 10 into a single fiber 20, and is directed to a wavelength separating receiver assembly (not shown) in the direction indicated by arrow 20a.

Figure 2:
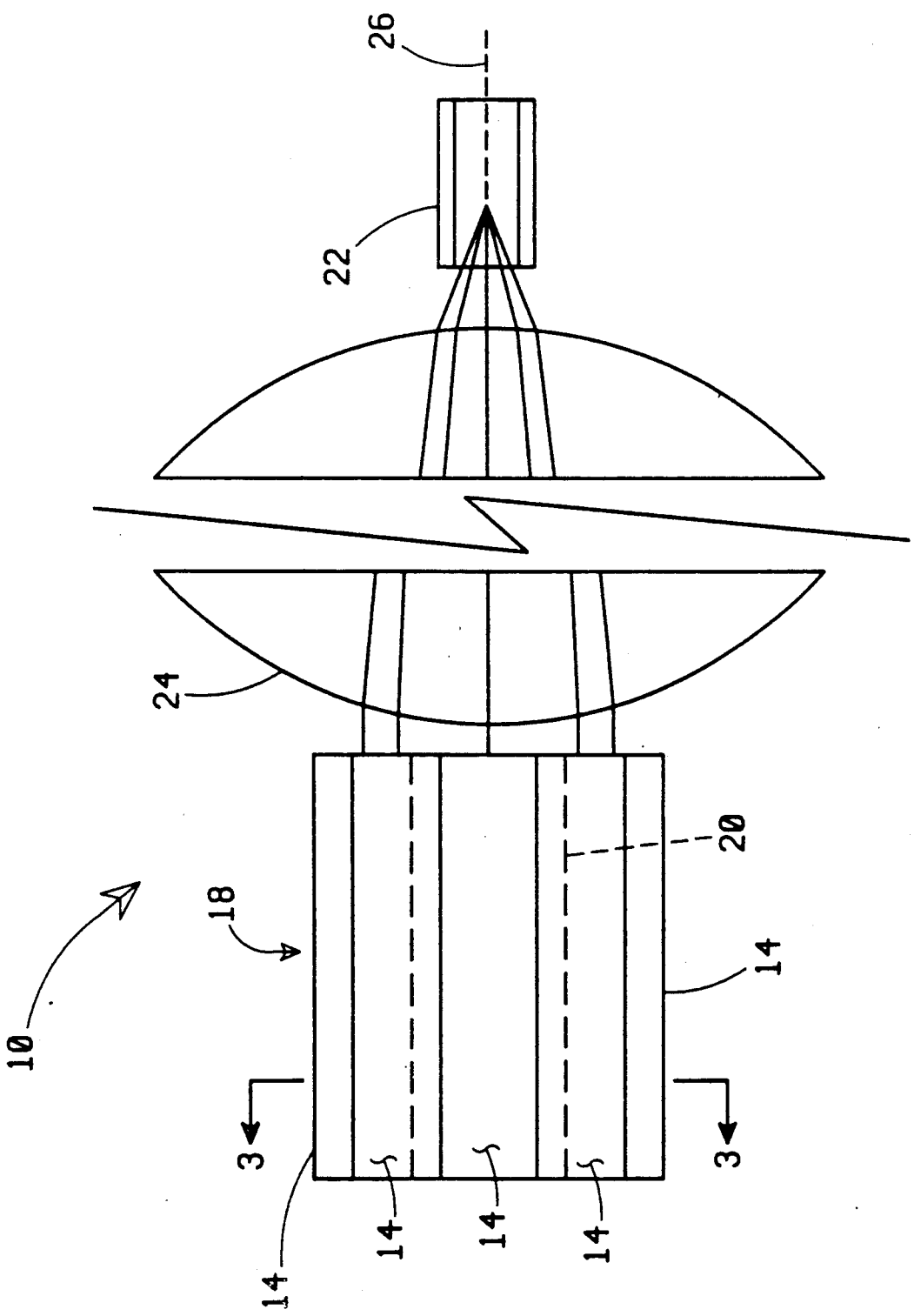
FIG. 2 shows a bundle of transmitting fibers surrounding a central fiber and adjacent a ball lens; and, FIG. 3 is a cross section of the line 3—3 of FIG. 2.
Figure 3:
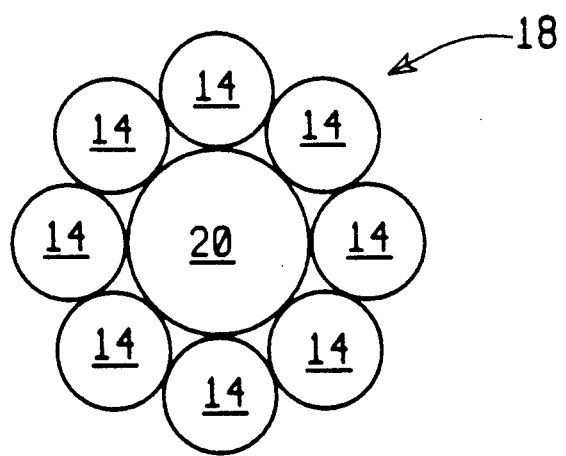

A detailed depiction of the multiplexer 10 is shown in FIGS. 2 and 3. The optical fibers 14 are directed toward the multiplexer and packed into a bundle 18 which surrounds a central core fiber 20. In close proximity to the bundle of fibers 18 is a fiber coupling sphere, 24, such as a spherical ball lens or a graded index lens (GRIN), whose optical geometry will create an exit cone 26 of light from the aggregate illumination of the fibers in the periphery of the bundle 18 that matches the acceptance cone of the single exit fiber 22. Light returning via the fiber 22 is focused so that the majority (90% or higher) of the light energy is accepted by the central fiber 20. Fiber 20 transports the multi-wavelength light to a receiver assembly (not shown).

The transmitting fibers 14 are each of the same nominal diameter. As shown in FIG. 3, the bundle 18 is a circumference of eight equal-diameter peripheral fibers 14 surrounding a central fiber 20. The multiplexer shown in FIG. 3 couples light from eight channels into a single optic fiber. It is to be understood that the number of peripheral fibers is not limited to the eight fibers shown, but may be any number of fibers which are close-packed about the periphery of a core fiber and offering the geometric potential for efficient coupling into an exit fiber 22. The term "close-packed", as used herein, describes a plurality of identical cylindrical fibers packed together and arranged around a central core fiber.

To allow for the close-packed array shown in FIG. 3, the nominal diameter of each fiber 14 is 125 microns, with the diameter of the core of the fibers 14 being 50 microns. The core fiber 20 has a larger nominal diameter than the transmitting fibers 14, preferably 225 microns. The transmitting fibers and the core fiber can be manufactured from any satisfactory commercially available material. Plastic or silica, single or multi-mode fibers can be made to perform satisfactorily with regard to certain engineering considerations. Such considerations include: (1) the fiber must not unacceptably attenuate light through the wavelength range desired; (2) if the total path from transmitter to receiver is long enough, wavelength-dependent dispersion effects will skew the pulse trains from color to color, making deskewing necessary at the receiver for parallel data transfers. Use of completely independent data streams on each color will obviate the need for this complication. Preferably, the fibers can be manufactured of hard-clad silica manufactured by Ensign-Blackford in either of the two diameters previously indicated.

An example of a coupling sphere 24 suitable to the arrangement shown in FIG. 3 would be a sphere of about 2 mm in diameter. It would be placed within about 1 to 2 microns of the fiber bundle 18. The distance between the sphere 24 and bundle 18 should provide enough separation to avoid rubbing contact, and yet be close enough to minimize the losses due to light expansion in the fiber exit cone. Preferably, the fiber bundle 18 is epoxied to the coupling sphere 24: the epoxy film provides the required physical isolation, support, and good optical coupling to the sphere. The distance from the coupling sphere 24 to the core fiber 20 is a function of the sphere's index of refraction and the diameter of the core of the fiber 20. For a fiber having a 50 micron core, an offset from the sphere of 185 to 300 microns is preferable.

In operation, the light emitted by each LED 12 is reduced to a narrow spectral width by a filter 16 whose passband differs from the filters used on any of the other LEDs in the group to provide a unique channel for the data stream emitted by that LED. This light is then transmitted through a fiber 14, in the direction shown by the arrow 14a in FIG. 1, and is directed into the coupling sphere 24. The light transmitted by each fiber 14 is focused by the coupling sphere 24 at the acceptance angle of the receiving fiber 22, combining the light from all peripheral fibers 14 to propagate to an identical device at the other end. Light entering the lens from fiber 22 will be focused predominantly into the acceptance angle of fiber 20 which will carry this combined return signal to a receiver not shown capable of separating the individual channels. The combined light is transmitted back through the coupling sphere 24 into the core fiber 20, and is transmitted in the direction shown by arrow 20a in FIG. 1 to a receiver (not shown).

The multiplexer shown and described provides for an efficient coupling of light. Approximately 90% of the combined light transmitted by the fibers 14 is returned to the receiver via the core fiber 20; only a negligible amount of the combined light is coupled back to the fibers 14. There has thus been shown a device which effects the efficient coupling of light from multiple fibers into a single fiber. The multiplexer has the potential to provide full-duplex, multi-channel data communications in parallel over a single fiber. Data transfers within and between computers is also enhanced since the use of fibers provides for greater time efficiency than conventional wire interfaces.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. An apparatus for simultaneous transmission of optic signals of different wavelengths over a single optic fiber comprising:
   a) multiple light sources each of a different wavelength;
   b) a coupling sphere proximal to the multiple light sources for focusing and combining optic signals emitted by the multiple light sources, and further where the coupling sphere has a refractive index such that about 90% of the combined optic signals from the multiple light sources emerging from said coupling sphere converge in the single optic fiber within the numerical aperture of the single optic fiber, whereby signals of different wavelengths can be transmitted by the single optic fiber simultaneously.

2. The apparatus of claim 1 as adapted for full duplex transmission further including:
   a) a core optical fiber positioned so that said multiple light sources are close-packed around said core fiber and further in which said core fiber is positioned so that the combined optic signals from the single fiber return through said coupling sphere and converge within said core fiber within the numerical aperture of said core fiber whereby full duplex transmission of optical signals of different wavelengths can be transmitted by the single optic fiber.

3. An apparatus for effecting the efficient coupling of light fibers into a single fiber comprising:
   a) a close-packed arrangement of equal-diameter peripheral fibers each transmitting light of different wavelengths,
   b) a central core fiber centrally disposed within the circumference of fibers,
   c) a receiving optical fiber,
   d) an optic coupler disposed between the transmitting fibers and the receiving fiber for directing and combining the light emitted by each fiber into the receiving fiber, and for then returning the combined light from the receiving fiber into the central core fiber,
   whereby the different wavelengths are coupled and transmitted by the core fiber.

4. An apparatus for effecting the efficient coupling of light from multiple fibers into a single fiber comprising:
   a) a plurality of optical fibers transmitting light of different wavelengths, close-packed and arranged around a central core fiber,
   b) a receiving optical fiber,
   c) an optic coupler intermediate the close-packed arrangement of fibers and the receiving optical fiber for directing the light emitted by each fiber into the receiving fiber such that the different wavelengths are combined, and further wherein the optic coupler is capable of returning at least 90% of the combined light from the receiving fiber into the central core fiber,
   whereby the different wavelengths are coupled and transmitted by the core fiber.

5. The apparatus of claim 4 wherein the transmitting optical fibers are each of the same nominal diameter, and the central core fiber has a nominal diameter larger than the diameter of the transmitting fibers.

6. An apparatus according to claim 4 in which the optic coupler is a lens.

7. An apparatus according to claim 6 in which the lens has a refractive index capable of creating an exit cone of light from the transmitting fibers which matches the numerical aperture of the receiving fiber.

8. An apparatus for effecting the efficient coupling of light from multiple fibers into a single fiber comprising:
   a) a close-packed bundle of optical fibers, each fiber transmitting light or different wavelengths,
   b) a receiving optical fiber having a central axis,
   c) a central core fiber surrounded by the bundle of transmitting fibers,
   d) a means intermediate the bundle of transmitting fibers and the receiving fiber for directing the light emitted by each transmitting fiber into the receiving fiber at the same angle of incidence with respect to the central axis of the receiving fiber, but with differing spatial orientations about the central axis,
   the light directing means further returning about 90% of the light from the receiving fiber into the central core fiber,
   whereby the different wavelengths are coupled and transmitted full duplex by the core fiber.

9. An apparatus according to claim 8 in which the means for directing the light is a lens.

10. An apparatus according to claim 9 in which the lens has a refractive index capable of creating an exit cone of light from the transmitting fibers which matches the numerical aperture of the receiving fiber.

* * * * *